United States Patent
Fleischer et al.

(10) Patent No.: US 11,575,401 B2
(45) Date of Patent: Feb. 7, 2023

(54) METHOD FOR PROCESSING OF PASSIVE INTERMODULATION PRODUCTS

(71) Applicant: NOKIA SOLUTIONS AND NETWORKS OY, Espoo (FI)

(72) Inventors: Marko Fleischer, Unterhaching (DE); Jan Hellmann, Munich (DE); Rene Röschke, Mammendorf (DE); Björn Jelonnek, Ulm (DE); Jürgen Hellstab, Neu-Ulm (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/487,528

(22) Filed: Sep. 28, 2021

(65) Prior Publication Data

US 2022/0109462 A1     Apr. 7, 2022

(30) Foreign Application Priority Data

Oct. 2, 2020   (FI) ..................................... 20205966

(51) Int. Cl.
*H04B 1/12*    (2006.01)

(52) U.S. Cl.
CPC ..................... *H04B 1/12* (2013.01)

(58) Field of Classification Search
CPC .......... H04B 1/12; H04B 1/525; H04B 1/109; H04B 1/10; H04B 1/0475; H04B 1/123; H04B 1/14; H04B 17/15; H04B 17/18; H04W 24/08
See application file for complete search history.

(56) References Cited

U.S. PATENT DOCUMENTS

| | | | |
|---|---|---|---|
| 10,812,166 B2* | 10/2020 | Kim | H03F 1/3247 |
| 11,025,464 B1* | 6/2021 | Chen | H04B 1/04 |
| 11,323,188 B2* | 5/2022 | Li | H04B 1/04 |
| 2014/0348263 A1* | 11/2014 | Rollins | H03F 1/3247 |
| | | | 375/296 |
| 2015/0244414 A1 | 8/2015 | Yu et al. | |

(Continued)

FOREIGN PATENT DOCUMENTS

EP     3 687 074 A1     7/2020

OTHER PUBLICATIONS

Extended European Search Report dated Feb. 25, 2022 corresponding to European Patent Application No. 21198787.0.

*Primary Examiner* — Dac V Ha
(74) *Attorney, Agent, or Firm* — Squire Patton Boggs (US) LLP

(57) ABSTRACT

An apparatus includes an estimation circuitry configured to receive a first set of one or more digital signals of transmitters of a communication system, and capture a set of one or more radio frequency signals that have been generated from the first set of digital signals The set of radio frequency signals being input of an antenna system of the communication system. Based on the first set of digital signals and the corresponding set of radio frequency signals, a set of weights related to a distortion effect caused by the generation of the radio frequency signals is derived. A received second set of digital signals is weighted using the set of weights, resulting in filtered signals. Using the filtered signals, a correction signal indicative of an interference caused by transmission of the second set of digital signals at a receiver of the communication system is estimated.

15 Claims, 6 Drawing Sheets

(56) References Cited

U.S. PATENT DOCUMENTS

| | | |
|---|---|---|
| 2017/0041039 A1 | 2/2017 | Hwang et al. |
| 2017/0230210 A1 | 8/2017 | Narasimha et al. |
| 2018/0248572 A1 | 8/2018 | Ishikawa et al. |
| 2021/0184723 A1* | 6/2021 | Brighenti ................ H04B 1/48 |
| 2022/0006430 A1* | 1/2022 | Rexberg ............... H04B 1/0475 |
| 2022/0052653 A1* | 2/2022 | Pratt ........................ H03F 3/19 |

* cited by examiner

METHOD FOR PROCESSING OF PASSIVE INTERMODULATION PRODUCTS

TECHNICAL FIELD

Various example embodiments relate to computer networking, and more particularly to a method for estimating an PIM correction signal due to passive intermodulation.

BACKGROUND

Intermodulation products may be generated in a wireless system when two or more signals at different frequencies are transmitted along a signal path including a component having a non-linear transmission characteristic; these products differ in frequency from the signals from which they were generated, and may potentially cause interference to other signals.

SUMMARY

Example embodiments provide an apparatus comprising an estimation circuitry. The estimation circuitry is configured to: receive a first set of one or more digital signals of transmitters of a communication system, capture a set of one or more radio frequency signals that have been generated from the first set of digital signals, the set of radio frequency signals being input of an antenna system of the communication system, derive based on the first set of digital signals and the corresponding set of radio frequency signals a set of weights related to a distortion effect caused by the generation of the radio frequency signals, weight a received second set of one or more digital signals using the set of weights, resulting in one or more filtered signals respectively, estimate using the filtered signals a correction signal indicative of an interference that is caused by a transmission of the second set of digital signals at a receiver of the communication system.

Example embodiments provide a method comprising: receiving a first set of one or more digital signals of transmitters of a communication system, capturing a set of one or more radio frequency signals that have been generated from the first set of digital signals, the set of radio frequency signals being input of an antenna system of the communication system, deriving based on the first set of digital signals and the corresponding set of radio frequency signals a set of weights related to a distortion effect caused by the generation of the radio frequency signals, weighting a received second set of one or more digital signals using the set of weights, resulting in one or more filtered signals respectively, estimating using the filtered signals a correction signal indicative of an interference that is caused by a transmission of the second set of digital signals at a receiver of the communication system Example embodiments provide a computer program comprising instructions stored thereon for causing an apparatus performing at least the following: receiving a first set of one or more digital signals of transmitters of a communication system, capturing a set of one or more radio frequency signals that have been generated from the first set of digital signals, the set of radio frequency signals being input of an antenna system of the communication system, deriving based on the first set of digital signals and the corresponding set of radio frequency signals a set of weights related to a distortion effect caused by the generation of the radio frequency signals, weighting a received second set of one or more digital signals using the set of weights, resulting in one or more filtered signals respectively, estimating using the filtered signals a correction signal indicative of an interference that is caused by a transmission of the second set of digital signals at a receiver of the communication system.

Example embodiments provide a communication system comprising an apparatus and a receiver. The apparatus comprises an estimation circuitry configured to: receive a first set of one or more digital signals of transmitters of the communication system, capture a set of one or more radio frequency signals that have been generated from the first set of digital signals, the set of radio frequency signals being input of an antenna system of the communication system, derive based on the first set of digital signals and the corresponding set of radio frequency signals a set of weights related to a distortion effect caused by the generation of the radio frequency signals, weight a received second set of one or more digital signals using the set of weights, resulting in one or more filtered signals respectively, estimate using the filtered signals a correction signal indicative of an interference that is caused by a transmission of the second set of digital signals at the receiver of the communication system.

BRIEF DESCRIPTION OF THE DRAWINGS

The accompanying figures are included to provide a further understanding of examples, and are incorporated in and constitute part of this specification. In the figures.

DETAILED DESCRIPTION

Figure 1:
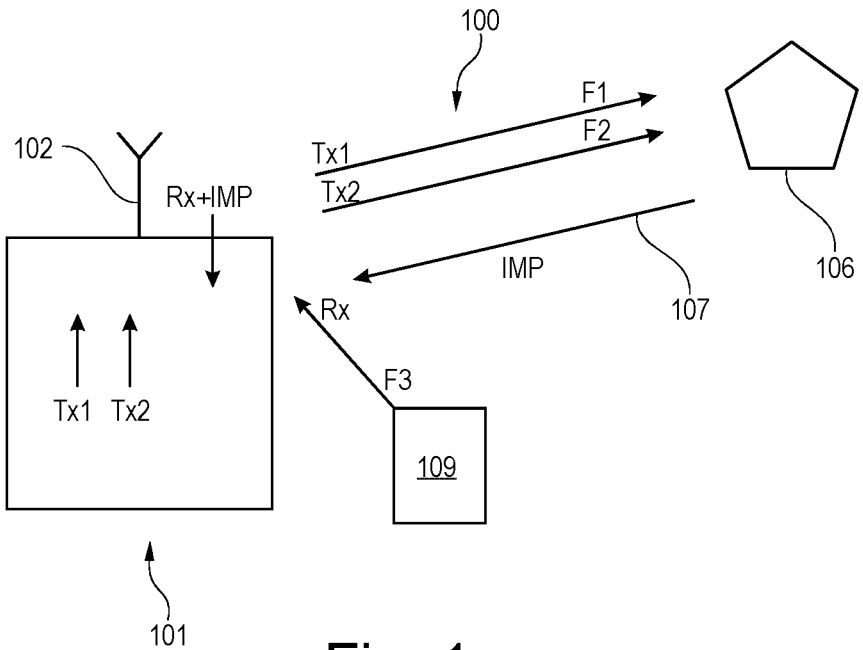
FIG. 1 depicts a diagram of a communication system.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

The communication system may support one or more radio access technologies (RATs). A radio access technology of the radio access technologies may, for example, be evolved universal terrestrial radio access (E-UTRA) or 5G new radio (NR), but it is not limited to, as a person skilled in the art may apply the present subject matter to other communication systems provided with necessary properties. The communication system may, for example, be configured to transmit data using the antenna system (or the antenna network) in accordance with a multiple input multiple output (MIMO) transmission method. The communication system may, for example, be a base station. The base station may serve at least one user equipment located within the base station's geographical area of service or a cell. The user equipment may receive data from the base station via respective pluralities of receive antennas.

The communication system may comprise receive chains and transmit chains. The digital signals of the transmitters may be processed in the transmit chains in order to produce the radio frequency (RF) signals that may be transmitted through a transmit antenna of the antenna system. The processing of each digital signal may, for example, be performed using components such as a digital-to-analogue converter (DAC), an amplifier and a duplexer. However, RF impairments caused by said components may change the characteristic of the digital signal i.e. the digital signal may not be an exact copy of the corresponding radio frequency signal. This may limit the PIM cancellation performance severely if it is based on digital signals only because the RF signals which are the origin of the PIM problem. The present subject matter may enable an accurate estimation of correction signals because it takes into account distortion effects due to radio frequency impairments in the transmit chains and optionally takes into account distortion effects due to radio frequency impairments in the receive chains. The correction signal may be referred to as PIM correction signal, PIM interference signal or interference signal. The apparatus that is configured to estimate the PIM correction signal may or may not be part of the communication system. Each of set of the first and second sets of one or more digital signals received at the apparatus may have distinct frequencies. The frequencies may be of a same transmission frequency band or of different transmission frequency bands. If the set of one or more digital signals comprise one signal, this one signal may be a composite signal having the different frequencies. The transmission of the set of one or more RF signals may induce passive intermodulation.

In order to estimate the correction signal, the set of weights (or filter weights) which may be complex coefficients may be derived using the first set of digital signals and corresponding set of RF signals. At run time of the communication system, RF signals generated from further received digital signals, e.g. the second set of digital signals, may cause PIM at the receiver of the communication system. The set of weights (named first set of weights) may be used to estimate the PIM correction signals using those received digital signals at run time.

The first set of digital signals that are used to derive the first set of weights related to the downlink distortion effect may be signals obtained at the run time of the communication system or may be test or calibration signals. That is, the derivation of the first set of weights may be performed as a pre-processing step and/or during the run time of the communication system. The first set of weights may be updated on a periodic basis e.g. every 1 minute. That is, the same first set of weights may be used at run time of the communication system to estimate the correction signal during 1 minute.

The number of the first set of digital signals used to derive the first set of weights may be equal to the number of the second set of digital signals. That is, if a composite signal (i.e. the number of the first set of digital signals is one) is used to derive the first set of weights, the PIM correction signal is estimated also using a composite signal. Each set of the first set and the second set of digital signals may be transmitted via the same transmit antenna of the antenna system.

According to an example, the estimation circuitry further comprises a correction unit configured to correct a signal being received at the receiver by using the PIM correction signal. The signal received via the transmit antenna at the receiver may be affected by the PIM caused by the transmission of the second set of signals via that transmit antenna. The correction unit may, for example, correct the signal by a subtraction processing of the PIM correction signal from the signal being received at the receiver. This example may mitigate the distortion effect that affects received signals at the receiver and may improve the PIM cancellation performance. The SNR for the wanted received signals may be improved due to subtraction.

The parallel operation of the receiver and the transmitters and the use of the same transmit antenna may cause interferences which may limit in particular the sensitivity on the receiver. For example, in case the communication system is a high power broadband multi-standard multicarrier FDD system, it is possible that the system performance and sensitivity is affected by transmitter induced passive intermodulation products falling into the receive band, e.g. at RX channels.

According to an example, the estimation circuitry is further configured for estimating an uplink distortion effect caused by a generation at the communication system of digital signals from received radio frequency signals, wherein the estimated PIM correction signal is corrected with the estimated uplink distortion effect. For that, the estimation circuitry may determine a second set of weights related to the uplink distortion effect. This second set of weights may be applied on the estimated PIM correction signal to obtain an improved PIM correction signal. This improved PIM correction signal may be subtracted, by the correction unit, from the signal being received at the receiver in order to obtain a corrected received signal. The second set of weights may be determined similarly as described with the first set of weights, with the difference that the captured RF signal has a RX frequency, while for the first set of weights the captured RF signal is at the TX frequency.

The estimation circuitry may, for example, comprise a filter weights estimation unit that estimates the sets of weights and at least one PIM correction signal unit that estimates the PIM correction signal. The filter weights estimation unit may operate according to a first mode of operation for estimating the first set of weights related to the downlink distortion effect. The filter weights estimation unit may operate according to a second mode of operation for estimating the second set of weights related to the uplink distortion effect. In the first mode of operation, the filter weights estimation unit may be configured to receive RF signals at TX frequency. In the second mode of operation, the filter weights estimation unit may be configured to receive signals at RX frequency. The filter weights estimation unit may be configured to switch between the first and second modes of operations.

The first set of weights and/or second set of weights may regularly be updated e.g. on a time periodic basis. This may be advantageous as it may take into account the effect of environmental and system changes. The changes may, for example, be the temperature, phase, delay, and/or power changes of the communication system.

This example may enable to model the uplink/RX behaviour of the receive chain and can thus increase the accuracy of the estimated PIM correction signal.

According to an example, the estimation of the PIM correction signal comprises weighting the filtered signals using parameters of a model descriptive of a passive intermodulation as function of the filtered signals, resulting in weighted signals respectively, and combining (e.g. summing) the weighted signals to obtain the PIM correction signal. The model may be the model of the PIM observed in the receiver. For example, the model may provide the PIM correction signal as function of the set of filtered signals e.g. and taking into account delays in the communication system. The model may include one or more order IM products e.g. IM3 and or IM5 products. For example, a PIM correction signal may be expressed in a Taylor series expansion with memories of a predefined order. For example, a non-linear modelling of the PIM correction signal RXEST may be in the form of RXEST=f(TXs), where f reflects an appropriate non-linear model (e.g. $TX^3$) and TXs are the filtered signals. The function f may have one or more model parameters.

Thus, the estimation circuitry may generate out of the received/captured second set of digital transmit signals a PIM correction signal while estimating a nonlinear relationship between the digital transmit signals and its output may be accompanied by an appropriate delay adjustment. The delay adjustment may be performed by a delay component that can be elsewhere in the modelled chain of the estimation circuitry e.g. it may be at the beginning of the chain.

The digital transmit signals may be changed in the analogue processing chain prior to cause PIM. Incorporating this knowledge into the estimation circuitry may be beneficial for performance reasons. Characterizing those distortions may be done while concurrently measuring digital transmit signals and their corresponding analogue response e.g. using a linear TX identification auxiliary receiver. The generated PIM signal in the antenna chain may also be prone to RX distortions caused mainly by the RX duplexer response. Including this knowledge into the estimation circuitry in addition may be beneficial to have an exact copy of the PIM correction signal to the received PIM noise.

According to an example, each set of the first and second set of digital signals comprises one composite signal that is obtained as a combination of multiple digital signals. In this case, only one filtered signal may result from the weighting of the composite signal. For example, the composite signal may be obtained as an output of a digital upconverter in response to receiving as input at the digital upconverter the multiple digital signals. For example, a non-linear modelling of the PIM correction signal RXEST may be in the form of RXEST=f(TX), where f reflects an appropriate non-linear model (e.g. $TX^3$) and TX is the filtered signal. The function f may have one or more model parameters.

The present subject matter may enable to process multiple digital signals that cause the PIM, individually or by combining them into the composite signal before generating the filtered signal. The processing of the composite signal may be simpler as it may involve less parameters than the individual processing of the digital signals.

According to an example, the antenna system comprises multiple transmit antennas, wherein the first and second sets of digital signals are transmitted via one transmit antenna of the antenna system. The estimation circuitry comprises a filter weights estimation unit. The filter weight estimation unit is configured to derive the first and second sets of weights for each transmit antenna of the antenna system. For example, each transmit antenna of the multiple transmit antennas may be associated with respective transmit chains and receive chains. The estimation circuitry may further comprise one PIM correction signal unit per transmit antenna so that at the run time (e.g. while the communication system is serving user equipment) they may operate concurrently or in parallel.

Assuming, for example, that the antenna system comprises two transmit antennas AT1 and AT2. Antenna AT1 may be associated with transmit chain TC1 and receive chain RC1 and antenna AT2 may be associated with transmit chain TC2 and receive chain RC2. Signals transmitted via antenna AT1 may cause PIM (PIM1) in a receiver of the receive chain RC1 and signals transmitted via antenna AT2 may cause PIM (PIM2) in a receiver of the receive chain RC2. The estimation circuitry may be configured to estimate PIM1 and PIM2. For that, the estimation circuitry may comprise one filter weights estimation unit and two PIM signal generation units associated with the two transmit antennas respectively. The filter weights estimation unit may derive the first and second sets of weights for each of the two transmit antennas. These sets of weights may be used by the respective PIM signal generation unit in order to determine the PIM signals.

The filter weights estimation unit is used or shared between the transmit antennas of the antenna system. The filter weights estimation unit may comprise a time multiplexed (auxiliary) receiver that may be shared in a timely fashion among the transmit antennas in order to receive and process the RF signals of the transmit antennas. This example may particularly be advantageous in case of a MIMO enabled system. It may, for example, save in a 4×4 MIMO configuration three entire RX RF chains while having same performance as in PIM receiver mode. The PIM receiver mode may require a permanent access to the transmitted RF signals at the antennas in order to generate the PIM correction signal in real time and thus may require that each transmit antenna is associated with a separate receive circuitry.

According to an example, the estimation circuitry is further configured to align the one or more filtered signals in accordance with delays. This example may further increase the estimation accuracy of the PIM correction signals and may reduce memory usage inside the estimation circuitry. The delay may, for example, indicate the time delay between the time of reception of the second set of one or more digital signals and the time at which the PIM signal induced by said received second set of digital signals is output by the receiver.

As used in this application, the term "circuitry" may refer to one or more or all of the following:
a) hardware-only circuit implementations (such as implementations in only analog and/or digital circuitry) and
b) combinations of hardware circuits and software, such as (as applicable):
   I. a combination of analog and/or digital hardware circuit(s) with software/firmware and
   II. any portions of hardware processor(s) with software (including digital signal processor(s)), software, and memory(ies) that work together to cause an apparatus, such as a mobile phone or server, to perform various functions) and
c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

FIG. 1 depicts a diagram of a communication system 100. The communication system 100 comprises a transceiver system 101. The transceiver system 101 may be a base station for a cellular communication network, but is not limited thereto. The transceiver system 101 may, for example, be a multi-carrier or multi-band system (e.g., a system that simultaneously operates in at least two different transmission frequency bands or at least two carriers in the same frequency band).

The transceiver system 101 is configured to send a set of signals via an antenna 102. For simplification of the description, only one antenna is shown but it is not limited to. Although only a set of two signals Tx1 and Tx2 is illustrated for this particular example, it should be appreciated that the set of signals may comprise more than two signals.

The set of signals Tx1 and Tx2 are transmitted at frequencies F1 and F2 respectively. However, intermodulation products may be generated when the set of signals Tx1 and Tx2 are transmitted along a signal path including a source of PIM. In one example, the source of PIM may include a source that is inside the transceiver system inducing a conducted PIM. In another example, the source of PIM may be outside the transceiver system triggering an air induced PIM. The air induced PIM may be caused by sources of PIM at predefined distances to the transceiver system 101. For example, in case of a transceiver system of a MIMO installation with several transmit signals, the transmit signals on the same frequency may cause higher power spectrum densities and thus metallic objects in a 10 meters distance or more from the transceiver system 101 may be not negligible and can cause uplink (UL) desensitization and throughput losses.

In the example shown in FIG. 1, the set of signals Tx1 and Tx2 impinge upon a source of PIM 106. The source of PIM 106 may, for example, be a metallic component comprising a ferromagnetic material. IM products 107 of the set of signals Tx1 and Tx2 are generated due to the non-linear response of the source of PIM 106.

The set of signals Tx1 and Tx2 may produce, for example, third order IM products at frequencies 2F1-F2 and 2F2-F1, fifth order IM products at frequencies 3F1-2F2 and 3F2-2F1 and other products. This provides relationships between signal frequencies, e.g. F1 and F2, and the frequencies of IM products produced from those frequencies. FIG. 1 shows that IM products 107 of the set of signals Tx1 and Tx2 are transmitted from the source of PIM 106. The transmission of the IM products 107 may be performed at a respective frequency of the IM products 107.

The IM products 107 fall at least in part, within a received channel at frequency F3 and appear as interference to a received signal Rx that is transmitted at radio frequency from, for example, a user equipment 109 in communication with the transceiver system 101.

Figure 2:
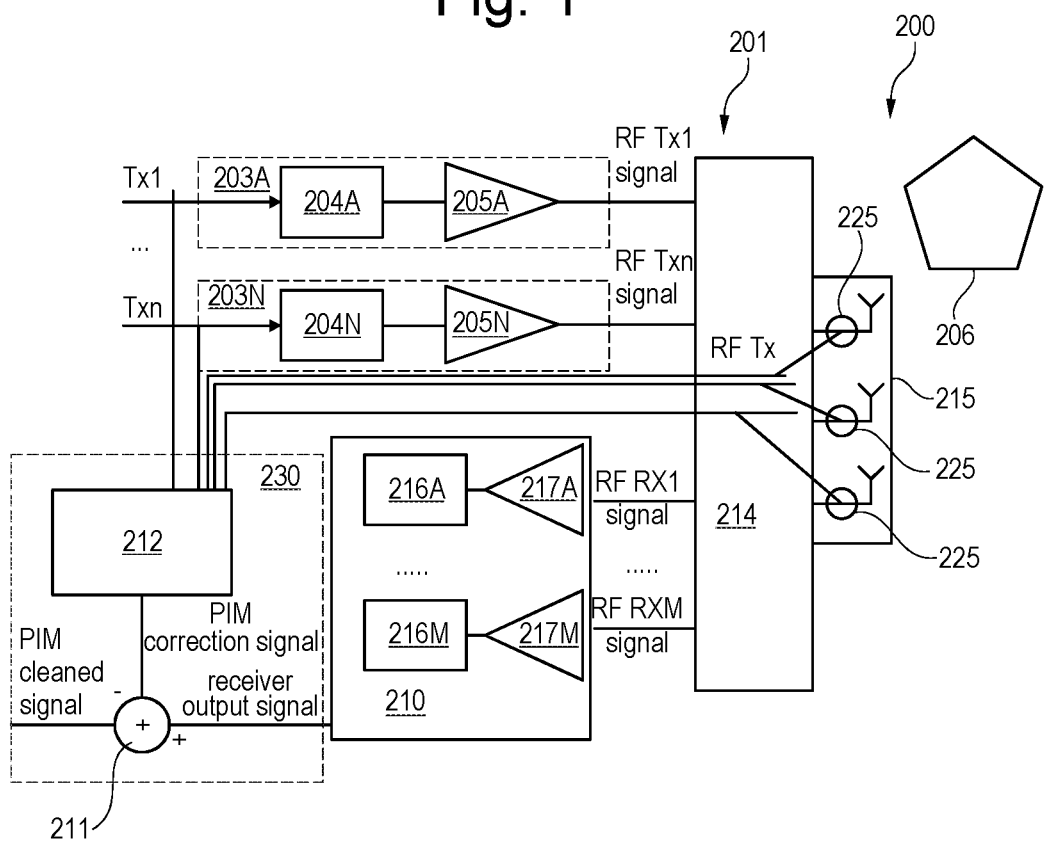
FIG. 2 depicts a diagram of a communication system in accordance with an example of the present subject matter.

FIG. 2 depicts a diagram of a communication system 200 in accordance with an example of the present subject matter. The communication system 200 may, for example, be a MIMO radio system. The communication system 200 comprises a transceiver system 201. The transceiver system 201 includes multiple transmitters 203A-N and a receiver 210 coupled to an antenna system 215 comprising multiple transmit antennas. For example, each subset of transmitters 203A-N may be coupled to respective transmit antennas 215. Each subset of transmitters may be configured to transmit data in a respective transmission frequency band (referred to as TX band). The TX bands may, for example, comprise long term evolution (LTE) bands 14, 17 and 29. The transmitters 203A-N and the receiver 210 may be coupled to the antenna system 215 via a duplexer 214. The signals captured by the antenna system 215 may be received at the receiver 210 of the transceiver system 201.

Each of the transmitters 203A-N may comprise a transmit chain including a digital-to-analog (D/A) converter 204A-N and a power amplifier (PA) 205A-N connected as shown. Each of the transmitters 203A-N operates to process a respective digital input signal Tx1-Txn, which may, for example, be a digital baseband signal, to output a radio frequency transmit signal. The transmitters 203A-N may enable streams from different frequencies of the same band or of different bands. The processing of the digital input signal may, for example, comprise a crest factor reduction (CFR) and digital predistortion processing. For example, the radio frequency transmit signal of each of the transmitters 203A-N passes through the duplexer 214 to a respective transmit antenna of the antenna array 215 such that the radio frequency transmit signal is transmitted by the transceiver system 201. For example, the RF signals associated with one transmit antenna (and are output of the duplexer) may be combined in order to be transmitted via the transmit antenna of the antenna system 315.

A source of PIM may be located inside the transceiver system 201 or outside the transceiver system 201. In the example of FIG. 2, a source of PIM 206 creating an air induced PIM is depicted. After being output, the radio frequency transmit signals pass through or impinge upon the source of PIM 206. Due to the non-linearity of the source of PIM, the PIM may be introduced into a radio frequency receive signal received at the receiver 210 via the antenna system 215 (the PIM signal falls in the receive band of the receiver 210 e.g. as shown in FIG. 1). The PIM may comprise IM products of the radio frequency transmit signals. The IM products include 3rd order IM products, fifth order IM products, etc.

The receiver 210 may, for example, include one or more receive chains comprising receiver components such as low-noise amplifiers (LNA) 217A-M, filters, down-conversion circuitries, analog-to-digital converters 216A-M, and the like. The receiver 210 operates to process (e.g., amplify, filter, down-convert, and analog-to-digital convert) radio frequency receive signals received from the antenna system 215 via the duplexer 214 to output one or more digital output signals 220, which is referred to herein as a receiver output signal 220.

The IM products of the radio frequency transmit signals produced by the source of PIM that may fall within a passband of the receiver 210 result in a PIM distortion in the receiver output signal 220 that is output by the receiver 210.

The PIM distortion, which is a digital signal referred to herein as a PIM signal or PIM correction signal, may be measured or determined. The PIM correction signal is determined by an apparatus 230. The apparatus 230 may be part of the transceiver system 201. Being part of the transceiver system 201 may enable an individual adaptation of the apparatus for different transceiver systems. In another example, the apparatus 230 may not be part of the transceiver system 201. This may enable a centralized and thus consistent control of PIM effects among different transceiver systems.

The apparatus 230 comprises an estimation circuitry 212 and a subtraction unit 211.

The estimation circuitry 212 is configured to receive the digital input signals Tx1 . . . Txn and corresponding RF signals captured at connection points or coupler elements 225 of the transmit antennas, as shown in FIG. 2, to estimate the PIM correction signal in accordance with the present subject matter. In one example, the estimation circuitry 212 may be provided using a FPGA or ASIC implementation. The PIM correction signal is generated such that the PIM distortion in the corrected output signal is minimized, or at least substantially reduced, as compared to the PIM distortion in the receiver output signal 220. The PIM correction signal is provided to subtraction circuitry 211. The subtraction circuitry 211 operates to subtract the PIM correction signal from the receiver output signal 220 in the digital domain to provide a corrected output signal which is referred to as an IM cleaned Rx main signal.

Components of the transmit and receive chains are generally well known by those skilled in the art and, consequently, are not described in detail herein.

Figure 3:
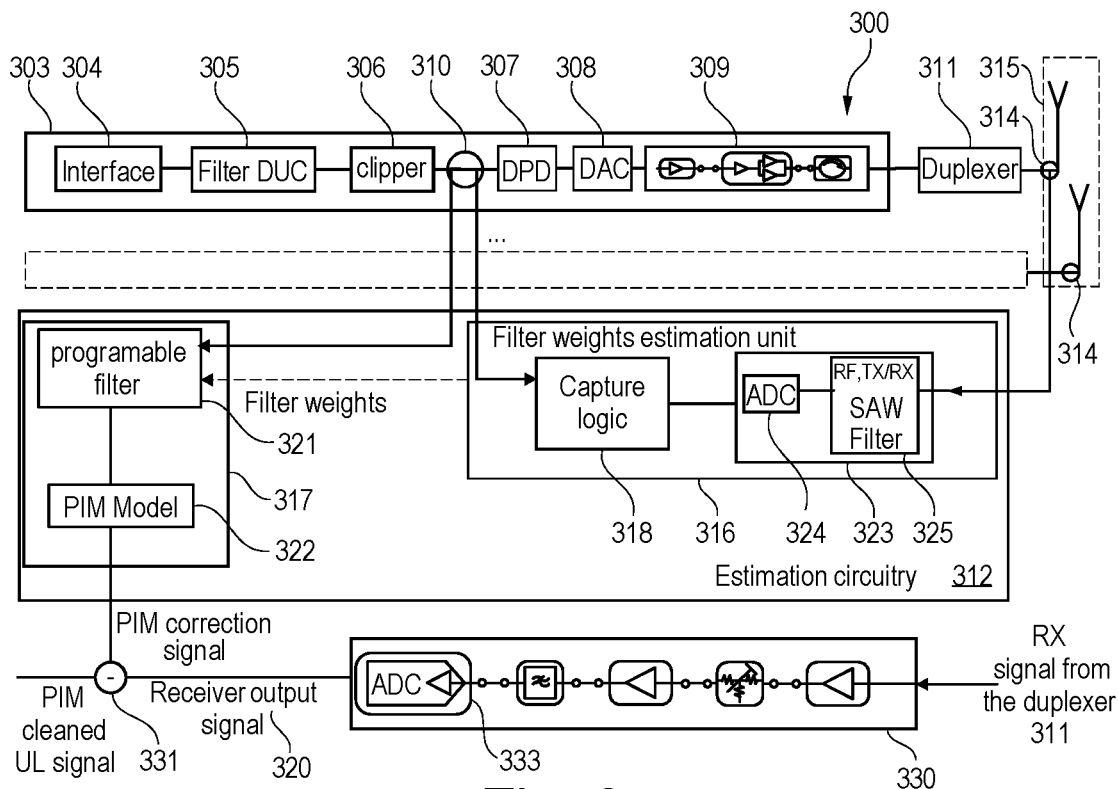
FIG. 3 depicts a diagram of a communication system in accordance with an example of the present subject matter.

FIG. 3 depicts a diagram of a communication system 300 in accordance with an example of the present subject matter. FIG. 3 provides further details of the estimation circuitry.

For simplification of the description, only one transmit chain 303 of a transmitter that is linked to one transmit antenna and one receive chain 330 of a receiver is shown. However, multiple transmit chains as indicated in FIG. 3 may be provided in association with each transmit antenna of the antenna system 315 of the communication system 300 and multiple receive chains may be provided. A set of digital signals Tx1 . . . Txn received at an interface 304 of the communication system 300 may be processed through the transmit chain 303. The interface 304 may, for example, be an optical interface. The set of digital signals may be provided in respective carriers. The transmit chain 303 may comprise components that process the set of digital signals in order to generate one RF signal to be transmitted through the transmit antenna to which the transmit chain 303 is linked. The components of the transmit chain 303 may, for example, comprise a digital upconverter 305, a full band clipper 306, a digital predistortion (DPD) component 307, a DAC 308 followed by an amplifier unit 309 that provides a signal input to a duplexer 311. The receive chain 330 may receive as input the RF RX signal from the duplexer 311. The receive chain 330 may, for example, include components such as an LNA, filters and an ADC that enable e.g. to amplify, filter, down-convert, and analog-to-digital convert.

The communication system 300 comprises an estimation circuitry 312. The estimation circuitry 312 comprises a filter weights estimation unit 316 and a PIM correction signal generation unit 317.

The filter weights estimation unit 316 is configured to receive or capture signals at different connection points 310 and 314 of the transmit chain 303. The filter weights estimation unit 316 is configured to receive signals at connection point 310 and receive corresponding RF signals at connection point 314. The connection point 310 is located at the output of the full band clipper 306 if the filter weights estimation unit is configured to process composite signals, otherwise the connection point 310 may be located between the interface 304 and the digital upconverter 305 in order to capture the set of digital signals. The connection point 314 is located at the input region of the transmit antenna. The filter weights estimation unit 316 may operate in accordance with a first mode operation and a second mode of operation. In the first mode of operation, the filter weights estimation unit 316 may estimate a set of filter weights related to a downlink distortion effect caused by the generation of the radio frequency signals in a defined TX frequency. In the second mode of operation, the filter weights estimation unit 316 may estimate a set of filter weights related to an uplink distortion effect caused by the generation of the radio frequency signals at a RX frequency. The filter weights estimation unit 316 may be configured to switch between the first and second modes of operation e.g. by switching between the TX and RX frequencies ranges e.g. using a filter bank.

FIG. 3 illustrates the first mode of operation of the filter weights estimation unit 316 for determining filter weights related to the downlink distortion effect caused by the generation of the (downlink) radio frequency signals between the connection points 310 and 314.

Figure 8:
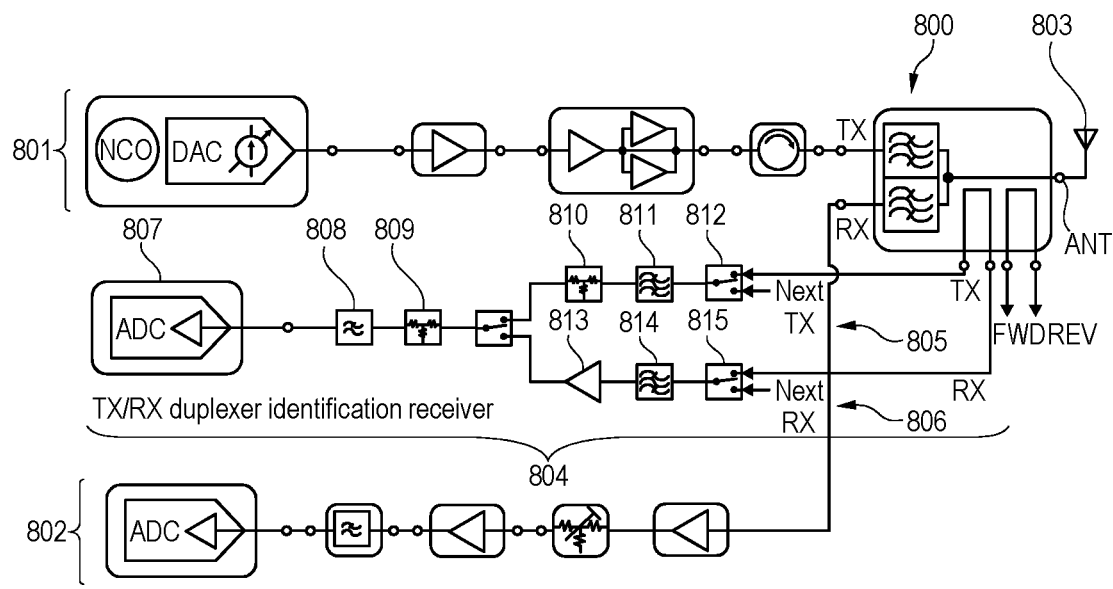
FIG. 8 is a block diagram of an auxiliary receiver in accordance with an example of the present subject matter.

The filter weights estimation unit 316 comprises an auxiliary receiver 323 and a capture logic 318. The auxiliary receiver 323 may, for example, comprise the same components as the receive chain 330, with the difference that it receives the input RF signal from the connection point 314 instead from the duplexer 311. For that, the auxiliary receiver 323 comprises a RF signal processing component 325 that is configured to process a RF signal and provide the processed RF signal to an ADC 324 of the auxiliary receiver 323 in order to provide a digital signal. The composite signal received at connection point 310 may be the desirable or ideal signal because it avoids RF impairments that may be caused e.g. by the duplexer 311. The RF signal processing component 325 may, for example, comprise a SAW filter and a low power amplifier. An example of the components of the auxiliary receiver 323 are shown in FIG. 8. The filter weights estimation unit 316 may receive at the capture logic 318 the composite signal (of the set of digital signals) from connection point 310.

Thus, for a received set of digital signals at the interface 304, the capture logic 318 may receive the composite signal from connection point 310 and corresponding digital signal from the auxiliary receiver 323. The capture logic 318 may be configured to estimate the filter weights such that an error between the digital signal of the auxiliary receiver 323 and the composite signal is minimized. The capture logic 318 may, for example, be a Least Mean Squares (LMS) based adaptive filter. The determined filter weights are then used to program a programable filter 321 of the PIM correction signal generation unit 317.

At the run time of the communication system, the programable filter 321 may be configured to provide a filtered signal by applying the filter weights to each composite signal received from the connection point 310. The filtered signal may be provided to the element 322 which applies the parameters of the PIM model on the filtered signal in order to provide a PIM correction signal to the subtraction circuitry 331. The PIM model may take into account the propagation delay (of the transmit signals and the PIM signal) in the communication system. The subtraction circuitry 331 operates to subtract the PIM correction signal from the receiver output signal 320 of the receiver chain 330. The receiver output signal 320 is the signal affected by the PIM induced by the set of signals Tx1 . . . Txn. The subtraction is performed in the digital domain to provide a corrected output signal.

The estimation circuitry 312 may be configured to determine the filter weights on a time periodic basis e.g. the filter weights may be determined using the filter weights estimation unit 316 every minute, the filter weights are used to generate PIM correction signals at run time during the minute, and the filter weights are then updated in the next minute and so on. The filter weights may be estimated using run time signals or calibration signals.

In one example, in order to estimate the air induced PIM signal caused by the multiple transmit antennas 315, the filter weights may be determined separately for each transmit chain associated with each of the transmit antennas. For example, if the transmit antennas comprise two transmit antennas, two sets of filter weights may be determined (as described above) for the two transmit chains respectively. In addition, the two sets of weights may be applied by respective programable filters on the composite signals of the two transmit chains respectively. The resulting two filtered signals may be processed by applying a common PIM model for generating the PIM correction signal.

Figure 4:
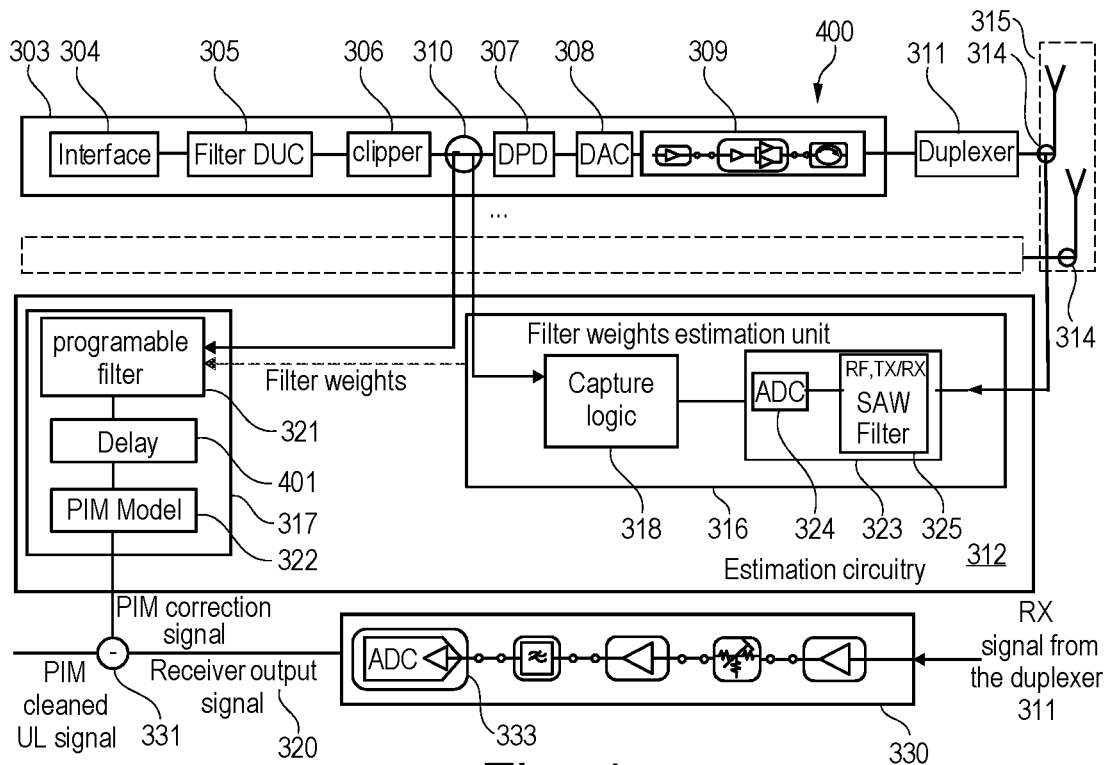
FIG. 4 depicts a diagram of a communication system in accordance with an example of the present subject matter.

FIG. 4 depicts a diagram of a communication system 400 in accordance with an example of the present subject matter. FIG. 4 provides further details of the estimation circuitry. The communication system 400 of FIG. 4 is similar to the communication system 300 of FIG. 3 and has in addition a delay component 401 of the PIM correction signal generation unit 317. The delay component 401 is configured to receive the filtered signal from the programable filter 321 and to align the filtered signal in accordance with a delay such that the estimated PIM correction signal is indicative of a particular order intermodulation, IM, product e.g. IM3 or IM5 product. The delay may, for example, be the difference between the time the composite signal is received from connection point 310 and the time the induced PIM signal is provided at the output of the ADC 333. The aligned signal is provided as input to the element 322 which applies the parameters of the PIM model on the filtered signal in order to provide a PIM correction signal to the subtraction circuitry 331. Although shown after the programable filter 321, the delay component 401 may be placed in any position along the chain of components of the PIM correction signal generation unit 317 e.g. it may be placed before the programable filter 321 or after the element 322.

Figure 5:
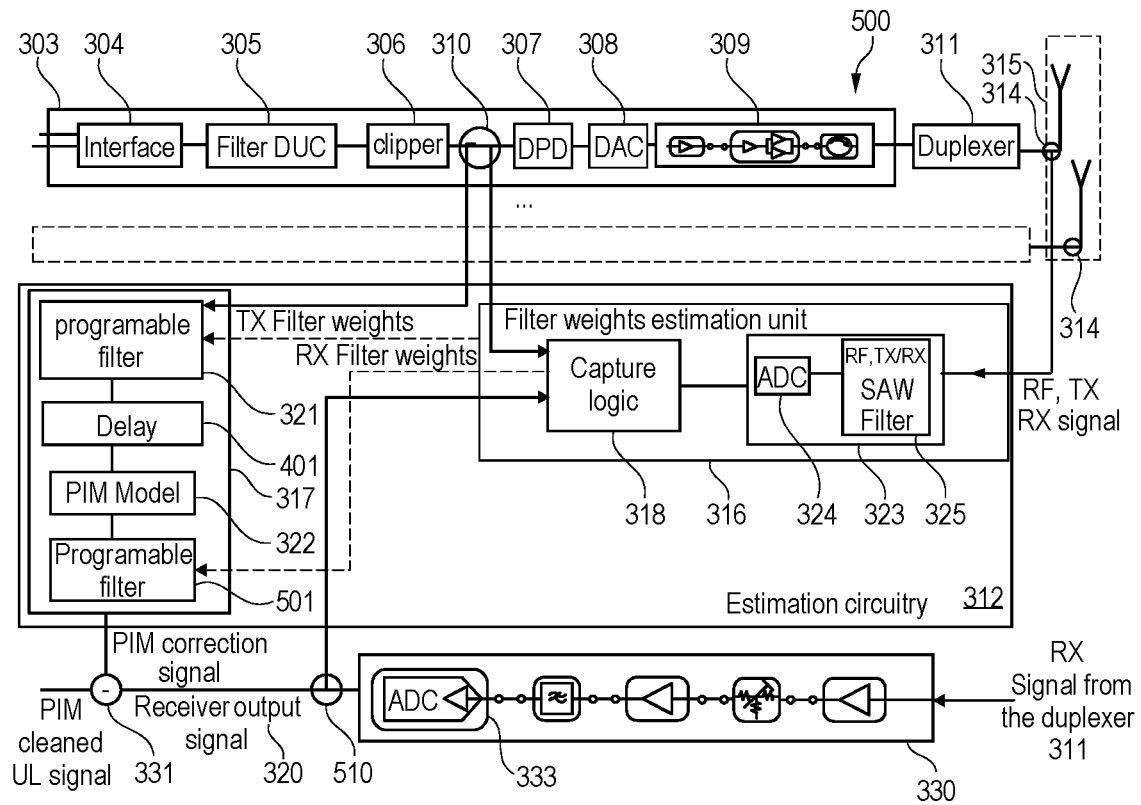
FIG. 5 depicts a diagram of a communication system in accordance with an example of the present subject matter.

FIG. 5 depicts a diagram of a communication system 500 in accordance with an example of the present subject matter. FIG. 5 provides further details of the estimation circuitry. The communication system 500 of FIG. 5 is similar to the communication system 400 of FIG. 4 and has in addition an additional programable filter 501. FIG. 5 illustrates the first and second modes of operation of the filter weights estimation unit 316. In the first mode of operation (as described above), the filter weights estimation unit 316 may receive signals from connection points 314 and 310. In the second mode of operation, the filter weights estimation unit 316 may receive signals from connection point 314 at RX frequency and connection point 510 at the output of the receive chain 330 and estimate the filter weights for the programable filter 501. The filter weights estimation unit 316 may be configured to switch between the two modes of operation in order to estimate the filter weights of the programable filters 321 and 501 respectively. In this second mode of operation, the desired signal may be the signal (which may be a PIM signal) obtained at connection point 314 because it avoids the RF impairments e.g. caused by the duplexer.

Figure 9:
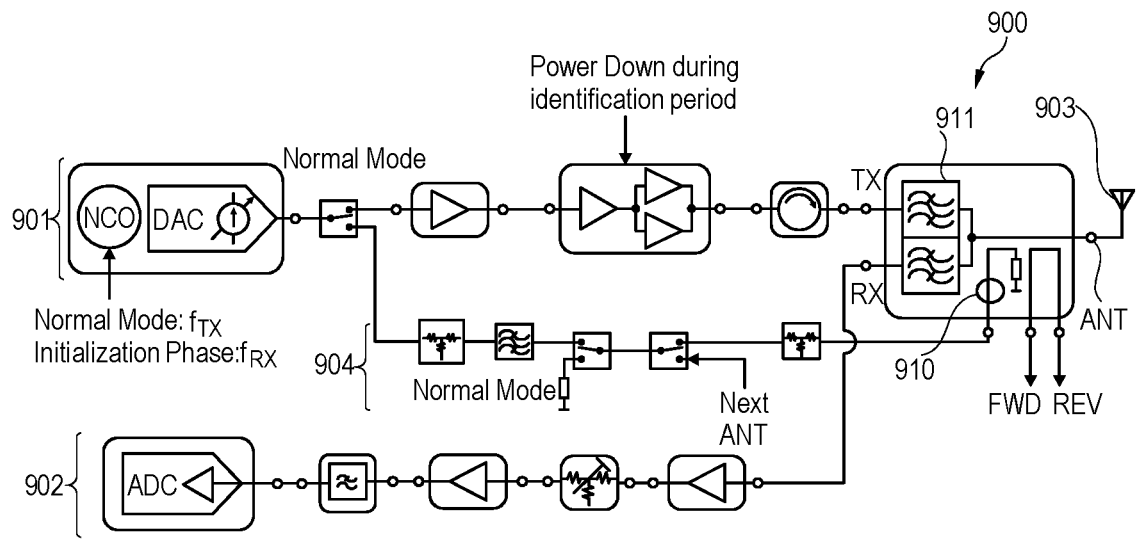
FIG. 9 is a block diagram of a communication system in accordance with an example of the present subject matter.

The programable filter 501 may take into account the uplink RF characteristic mainly defined by the RX duplex filter by applying filter weights to the PIM correction signal received from the element 322. The filter weights estimation unit 316 may be configured to estimate said filter weights in a similar way as described with reference to FIG. 3. The capture logic 318 may receive the signal at the connection point 510 and an ideal PIM signal from the auxiliary receiver 323 and may determine the filter weights accordingly. The auxiliary receiver 323 may receive the RF signal (which may be a PIM signal) at connection point 314 process it and provide the ideal PIM signal. The programable filter 501 may, for example, receive as input the PIM correction signal from the element 322 and apply the filter weights to the PIM correction signal in order to obtain a signal named a corrected PIM correction signal because it additionally takes into account the RF impairments in the receive chain. FIG. 9 provides an alternative implementation to provide the two input signals of the capture logic 318 in order to estimate the filter weights for the programable filter 501.

Figure 6:
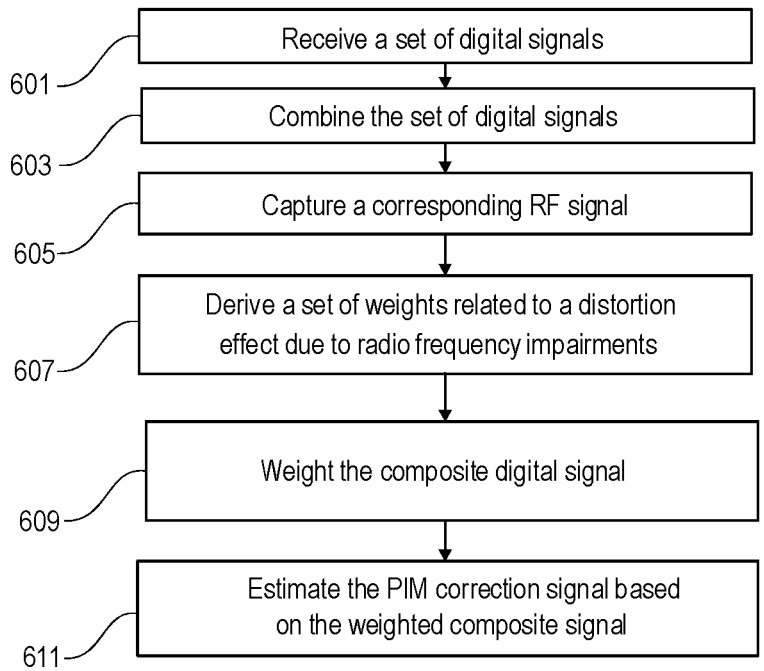
FIG. 6 is a flowchart of a method for estimating an PIM correction signal in accordance with an example of the present subject matter.

FIG. 6 is a flowchart of a method in accordance with the present subject matter. For the purpose of explanation, the method may be implemented in the system illustrated in previous FIGS. 1-5, but is not limited to this implementation.

A set of digital signals Tx1 . . . Txn of transmitters 203A-N may be received in step 601. The set of digital signals may have respective distinct frequencies. The frequencies may be of a same transmission frequency band or of different transmission frequency bands. The transmission bands may, for example, comprise LTE bands 14, 17 and 29. The set of digital signals may, for example, be transmitted via one transmit antenna, named AT1, of the antenna system 215.

The set of digital signals Tx1 . . . Txn may be combined in step 603 to obtain a composite signal. For example, the set of digital signals may be input to the digital upconverter 305 in order to obtain the composite signal.

The composite signal and the radio frequency signal that has been generated from the composite signal may be captured or received in step 605 at the estimation circuitry 312. For example, the RF signal may be captured at the connection point 314 associated with the transmit antenna AT1, before being transmitted via the transmit antenna AT1 and the composite signal may be captured at the connection point 310.

The estimation circuitry may derive or determine or generate in step 607 based on the composite signal and corresponding captured radio frequency signal a set of weights related to a distortion effect caused by the generation of the radio frequency signal between the connection points 310 and 314. For example, the filter weights estimation unit 316 may receive as input the composite signal and the captured RF signal. The set of weights may be derived by the filter weights estimation unit 316 as described with reference to FIG. 3. The captured RF signal may, for example, be processed by the auxiliary receiver 323 to generate a corresponding digital signal named output digital signal. The capture logic 318 may receive the output digital signal and the composite signal. The capture logic 318 may be configured to estimate the set of weights such that an error between the output digital signal and the composite signal is minimized.

According to an example, a filter weights generation method may be provided. The filter weights generation method comprises steps 605 and 607. That is, the filter weights generation method may comprise receiving a composite signal and corresponding generated RF signal and estimating the set of weights using the received composite signal and corresponding RF signal. The set of weights may be used by a PIM correction signal estimation method comprising steps 609 and 611.

The set of weights may be used at run time of the communication system. For that, received composite signals at the connection point 310 may be weighted in step 609 using the set of weights derived in step 607, in order to provide one filtered signal ts. This step 609 may, for example, be performed by the programable filter 321.

A PIM correction signal that is caused by the captured radio frequency signal at the receiver 210 may be estimated in step 611 using the filtered signal ts. The estimating of the PIM correction signal comprises weighting the filtered signal ts using parameters of a PIM model descriptive of a passive intermodulation as function of the filtered signal ts, resulting in the PIM correction signal. The PIM model may include one or more order IM products e.g. IM3 and or IM5 products.

The PIM correction signal estimation method may be performed independently of the filter weights generation method. For example, steps 609 and 611 may be repeated for a predefined time period using the same set of weights. After that time period ends, another set of weights may be determined using the filter weights generation method. This other set of weights may be used for a subsequent time period by the PIM correction signal estimation method, and so on.

Figure 7:
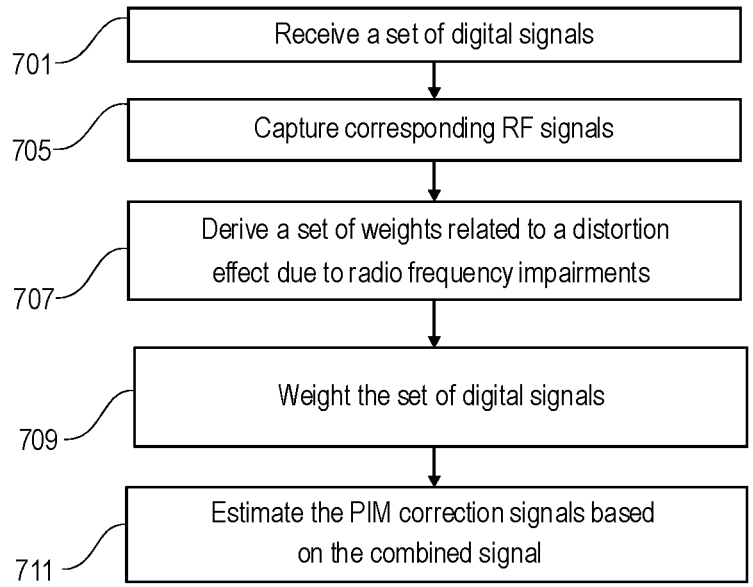
FIG. 7 is a flowchart of a method for estimating an PIM correction signal in accordance with an example of the present subject matter.

FIG. 7 is a flowchart of a method in accordance with the present subject matter. For the purpose of explanation, the method may be implemented in the system illustrated in previous FIGS. 1-5, but is not limited to this implementation.

A first set of digital signals Tx1 . . . Txn of transmitters 203A-N may be received in step 701 at the estimation circuitry 212. The first set of digital signals may, for example, be obtained from a point of the transmit chain between the interface 304 and the digital upconverter 305. The first set of digital signals may have respective distinct frequencies. The frequencies may be of a same transmission frequency band or of different transmission frequency bands. The transmission bands may for example comprise LTE bands 14, 17 and 29. The first set of digital signals may, for example, be transmitted via one transmit antenna, named AT1, of the antenna system 215.

The set of radio frequency signals that have been generated from the first set of digital signals may be captured in step 705. For example, the set of RF signals may be captured at the output of the duplexer 311 e.g. the set of RF signals may or may not be combined into a single RF signal to be transmitted with the transmit antenna AT1.

The estimation circuitry may derive in step 707 based on each signal of the first set of digital signals and corresponding captured radio frequency signal a set of weights related to a distortion effect caused by the generation of the radio frequency signal in the transmit chain e.g. between connection point 314 and the connection point located between the interface 304 and the digital upconverter 305. The captured RF signals may, for example, be processed by the auxiliary receiver 323 to generate corresponding digital signals.

Assuming for simplification of the description that the first set of signals has two signals (n=2). Step 707 may result in two sets of weights.

At run time of the communication system, each received signal of a set of digital signals may be weighted in step 709 using the respective set of weights derived in step 707, in order to provide one filtered signal. This may result in a set of filtered signals. Following the above example, two filtered signals may be provided in step 709.

These two filtered signals may be processed together in step 711 in order to estimate the PIM correction signal that is caused at the receiver 210 by the radio frequency signal. For example, the set of filtered signals may be weighted using parameters of a PIM model descriptive of a passive intermodulation as function of the filtered signals, resulting in weighted signals respectively, and the weighted signals may be summed to obtain the PIM correction signal. Processing individual signals according to the method of FIG. 7 may be advantageous as it may enable to take into account the air induced PIM or conducted PIM.

FIG. 8 is a diagram of an example implementation of an auxiliary receiver in accordance with an example of the present subject matter. FIG. 8 provides an example implementation for providing inputs to the capture logic 318 in the first or second mode of operation. A communication system 800 (e.g. as described with reference to FIG. 2) having transmit chains 801 and receive chains 802 may be configured to include the auxiliary receiver 804. The auxiliary receiver 804 may comprise one transmit path 805 associated with downlink transmissions of the communication system 800 and one receive path 806 associated with the uplink transmissions. The transmit path 805 comprises components 807 through 812. The receive path 806 comprises components 807, 808, 809, 813, 814 and 815. The components 808, 811 and 814 are filters. The component 807 is an ADC. The components 812 and 815 are switches or RF circuitries that may act as switches such as directional couplers. Each of the components 809 and 810 is a combination of resistors.

The auxiliary receiver 804 may be configured to receive a RF signal (named test RF signal) via the transmit path 805 or the receive path 806, process the test RF signal to obtain a digital signal and provide the digital signal to the capture logic 318. In one example, the test RF signal may be a transmit RF signal that is to be transmitted (TX) through the transmit antenna 803 and captured/received through the transmit path 805 as indicted in FIG. 8. There is one transmit antenna 803 for transmission and reception. The transmit path 805 is operating in TX frequency and the receive path is operating in the RX frequency. In another example, the test RF signal may be a RF PIM signal (RX) that is induced by the signal transmitted through the antenna 803 and that is received via the receive path 806. As shown in FIG. 8, each of the two test RF signals is processed using components of the respective path 805 and 806. The auxiliary receiver 804 may provide the digital signals for estimating filter weights that take into account both RF impairments in the downlink and uplink directions and may thus enable a compact implementation of the estimation circuitry 312. The auxiliary receiver 804 may be configured to switch between the TX frequency and the RX frequency in order to receive the transmitted RF signal or the RF PIM signal.

FIG. 9 is a diagram of an example implementation of a communication system in accordance with an example of the present subject matter. A communication system 900 (e.g. as described with reference to FIG. 2) having a transmit antenna 903 transmit chains 901 and receive chains 902 may be configured to include an auxiliary transmitter. The auxiliary transmitter may comprise a transmit path 904 in the communication system 900. The transmit path 904 may comprise components such as filters and switches. The auxiliary transmitter may be configured to inject a test transmit signal through the transmit path 904. The receive chains 902 may receive/capture the test transmit signal as an RX signal via the duplexer 911, process the RX signal to obtain a digital signal and provide the obtained digital signal to the capture logic 318. The capture logic 318 may further receive the signal as injected e.g. at the point 910. The injected signal may be the ideal signal as it may avoid RF impairment caused e.g. by the duplexer 911.

Figure 10:
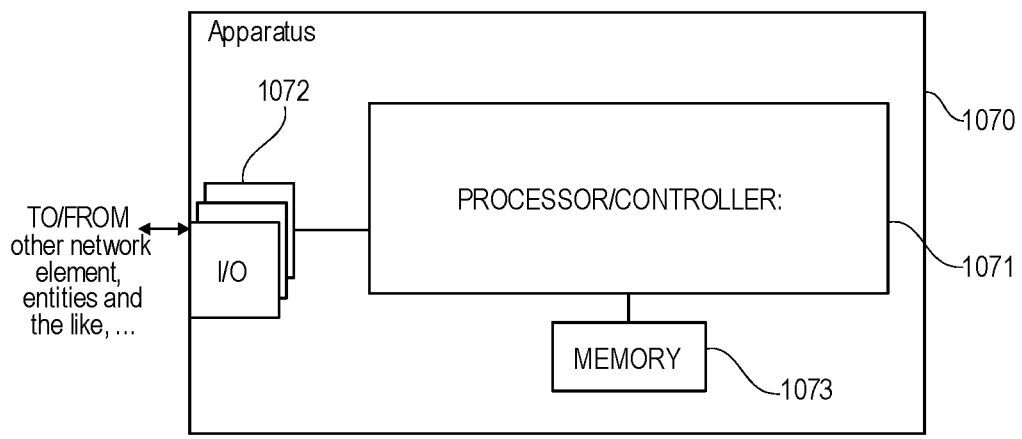
FIG. 10 is a block diagram showing an example of an apparatus according to an example of the present subject matter.

In FIG. 10, a block circuit diagram illustrating a configuration of an apparatus 1070 is shown, which is configured to implement at least part of the present subject matter. It is to be noted that the apparatus 1070 shown in FIG. 10 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus, or the like. The apparatus 1070 may comprise a processing function or processor 1071, such as a CPU or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements, or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform at least part of the method as described in connection with FIG. 6 or 7.

The processor 1071 is configured to receive a first set of one or more digital signals of transmitters of a communication system; capture a set of one or more radio frequency signals that have been generated from the first set of digital signals, the set of radio frequency signals being input of an antenna system of the communication system; derive based on the first set of digital signals and the corresponding set of radio frequency signals a set of weights related to a distortion effect caused by the generation of the radio frequency signals; weight a received second set of one or more digital signals using the set of weights, resulting in one or more filtered signals respectively; estimate using the filtered signals a correction signal indicative of an interference that is caused by a transmission of the second set of digital signals at a receiver of the communication system.

Figure 11:
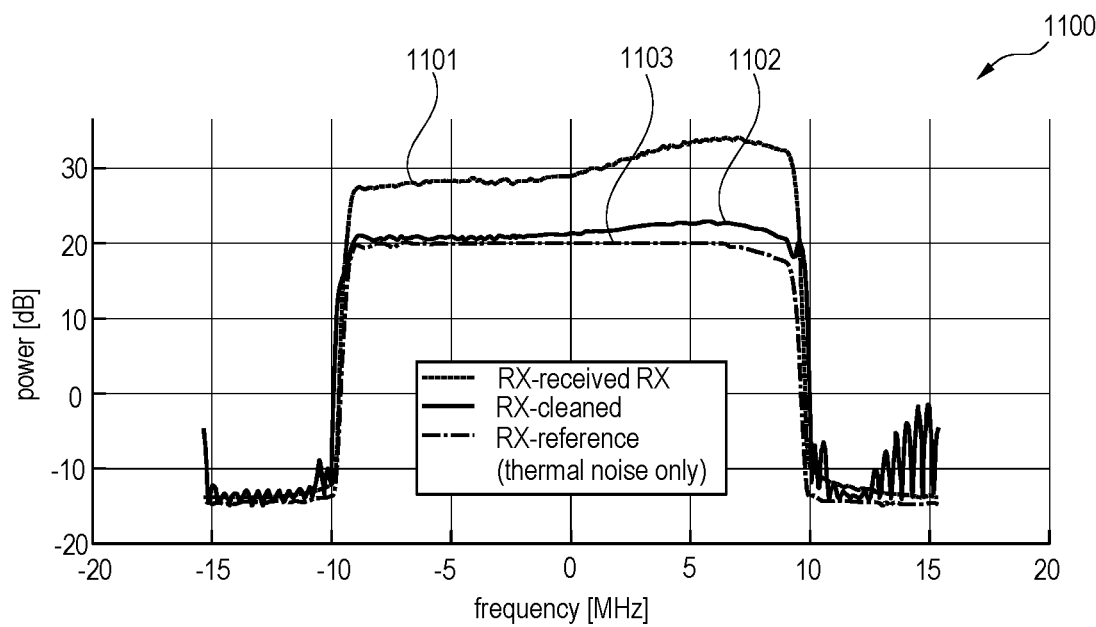
FIG. 11 depicts PIM cancelation results in accordance with an example of the present subject matter.
Figure 11:
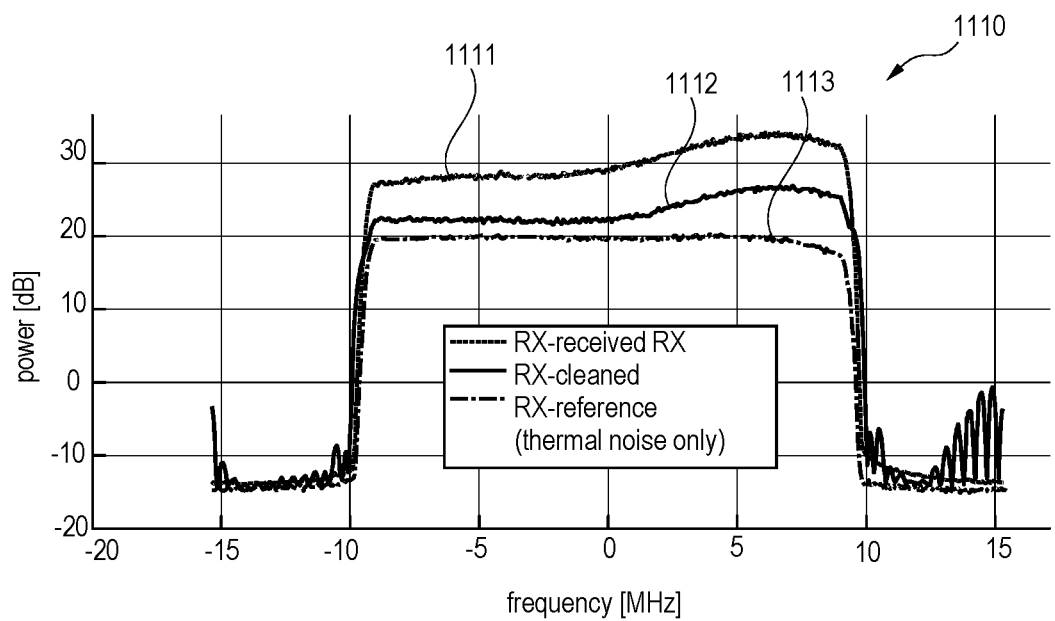

FIG. 11 depicts a cancellation result for a LTE20 UL carrier with PIM noise from a real B20/628 deployment. The PIM noise level 1101 or 1111 is about 11.1 dB higher than RX noise level 1103 or 1113 respectively. Depicted in the plot 1100, is the case where DL/TX programable FIR filter 321 is used to take into account the downlink distortion effect. In this case, a cancellation gain of 9.3 dB is obtained as indicted by the curve of the RX-cleaned signal 1102. This by contrast to the case of the plot 1110 where the downlink distortion effect is not taken into account. There, only a gain of 6.8 dB can be obtained as indicated by the RX cleaned signal 1112.

The invention claimed is:

1. An apparatus, comprising:
   at least one processor; and
   at least one memory including computer program code, the at least one memory and computer program code being configured, with the at least one processor, to cause the apparatus to:
   receive a first set of one or more digital signals of transmitters of a communication system;
   capture a corresponding set of one or more radio frequency signals that have been generated from the first set of digital signals, the set of radio frequency signals being input to an antenna system of the communication system;
   derive, based on the first set of digital signals and the corresponding set of radio frequency signals, a set of weights related to a distortion effect caused by the generation of the radio frequency signals;
   weight a received second set of one or more digital signals using the derived set of weights, resulting in one or more filtered signals respectively;
   align the filtered signals in accordance with delays;
   estimate, using the aligned filtered signals, a correction signal indicating an interference that is caused by a transmission of the second set of digital signals at a receiver of the communication system; and
   correct a signal received at the receiver by using the estimated correction signal.

2. The apparatus of claim 1, wherein the at least one memory and computer program code are further configured, with the at least one processor, to cause the apparatus to derive another set of weights related to an uplink distortion effect caused by a generation at the communication system of digital signals from received radio frequency signals, wherein the estimated correction signal is weighted using the other set of weights.

3. The apparatus of claim 1, wherein the estimation of the correction signal comprises weighting the filtered signals using parameters of a model descriptive of a passive intermodulation as a function of the filtered signals, resulting in weighted signals respectively, and combining the weighted signals to obtain the correction signal.

4. The apparatus of claim 1, wherein:
   each set of the first and second sets of digital signals comprises a composite signal that is obtained as a combination of multiple digital signals, and
   the estimation of the correction signal comprises weighting the filtered signal using parameters of a model descriptive of a passive intermodulation as a function of the filtered signal, the weighted signal being the correction signal.

5. The apparatus of claim 1, wherein:
   the antenna system comprises multiple transmit antennas, the first and second sets of digital signals being transmitted via one transmit antenna of the multiple transmit antennas of the antenna system, and
   the at least one memory and computer program code are further configured, with the at least one processor, to derive the sets of weights for each transmit antenna of the multiple transmit antennas of the antenna system.

6. A method for a communication system, the method comprising:
   receiving a first set of one or more digital signals of transmitters of the communication system;

capturing a corresponding set of one or more radio frequency signals that have been generated from the first set of digital signals, the corresponding set of radio frequency signals being input to an antenna system of the communication system;

deriving, based on the first set of digital signals and the corresponding set of radio frequency signals, sets of weights for each transmit antenna of multiple transmit antennas of the antenna system related to a distortion effect caused by the generation of the radio frequency signals, the first and second sets of digital signals being transmitted via one transmit antenna of the multiple transmit antennas of the antenna system;

weighting a received second set of one or more digital signals using the derived sets of weights, resulting in one or more filtered signals respectively;

estimating, using the filtered signals, a correction signal indicating an interference that is caused by a transmission of the second set of digital signals at a receiver of the communication system; and correcting a signal received at the receiver by using the estimated correction signal.

7. The method of claim 6, further comprising deriving another set of weights related to an uplink distortion effect caused by a generation at the communication system of digital signals from received radio frequency signals, and weighting the estimated correction signal using the other set of weights.

8. The method of claim 6, wherein the estimation of the correction signal comprises weighting the filtered signals using parameters of a model descriptive of a passive intermodulation as a function of the filtered signals, resulting in weighted signals respectively, and combining the weighted signals to obtain the correction signal.

9. The method of claim 6, wherein:
each set of the first and second sets of digital signals comprises a composite signal that is obtained as a combination of multiple digital signals, and
the estimation of the correction signal comprises weighting the filtered signal using parameters of a model descriptive of a passive intermodulation as a function of the filtered signal, the weighted signal being the correction signal.

10. A communication system comprising:
a receiver; and
an apparatus including:
at least one processor; and
at least one memory including computer program code, the at least one memory and computer program code being configured, with the at least one processor, to cause the apparatus to:
receive a first set of one or more digital signals of transmitters of the communication system;
capture a set of one or more radio frequency signals that have been generated from the first set of digital signals, the set of radio frequency signals being input to an antenna system of the communication system;
derive, based on the first set of digital signals and the corresponding set of radio frequency signals, sets of weights for each transmit antenna of multiple transmit antennas of the antenna system related to a distortion effect caused by the generation of the radio frequency signals, the first and second sets of digital signals being transmitted via one transmit antenna of the multiple transmit antennas of the antenna system;

weight a received second set of one or more digital signals using the derived sets of weights, resulting in one or more filtered signals respectively;
estimate, using the filtered signals, a correction signal indicating an interference that is caused by a transmission of the second set of digital signals at the receiver of the communication system; and
correct a signal received at the receiver by using the estimated correction signal.

11. The communication system of claim 10, wherein the at least one memory and computer program code are further configured, with the at least one processor, to cause the apparatus to derive another set of weights related to an uplink distortion effect caused by a generation at the communication system of digital signals from received radio frequency signals, wherein the estimated correction signal is weighted using the other set of weights.

12. The communication system of claim 10, wherein the estimation of the correction signal comprises weighting the filtered signals using parameters of a model descriptive of a passive intermodulation as a function of the filtered signals, resulting in weighted signals respectively, and combining the weighted signals to obtain the correction signal.

13. The communication system of claim 10, wherein:
each set of the first and second sets of digital signals comprises a composite signal that is obtained as a combination of multiple digital signals, and
the estimation of the correction signal comprises weighting the filtered signal using parameters of a model descriptive of a passive intermodulation as a function of the filtered signal, the weighted signal being the correction signal.

14. The communication system of claim 10, wherein the at least one memory and computer program code are further configured, with the at least one processor, to cause the apparatus to align the filtered signals in accordance with delays.

15. An apparatus comprising:
at least one processor; and
at least one memory including computer program code, the at least one memory and computer program code being configured, with the at least one processor, to cause the apparatus to:
receive a first set of one or more digital signals of transmitters of a communication system;
capture a corresponding set of one or more radio frequency signals that have been generated from the first set of digital signals, the set of radio frequency signals being input to an antenna system of the communication system;
derive a first set of weights related to a distortion effect caused by the generation of the radio frequency signals based on the first set of digital signals and the corresponding set of radio frequency signals;
derive a second set of weights related to an uplink distortion effect caused by a generation at the communication system of digital signals from received radio frequency signals;
weight a received second set of one or more digital signals using the derived first set of weights, resulting in one or more filtered signals respectively;
estimate, using the filtered signals, a correction signal indicating an interference that is caused by a transmission of the second set of digital signals at a receiver of the communication system, the estimated correction signal is weighted using the derived second set of weights; and correct a signal received at the receiver by using the estimated correction signal.

* * * * *